US006987080B2

(12) United States Patent
Schmitz

(10) Patent No.: US 6,987,080 B2
(45) Date of Patent: Jan. 17, 2006

(54) ETHYLENE OXIDE CATALYST CARRIER PREPARATION

(75) Inventor: Andrew D. Schmitz, Rutherford, NJ (US)

(73) Assignee: Scientific Design Company, Inc., Little Ferry, NJ (US)

( * ) Notice: Subject to any disclaimer, the term of this patent is extended or adjusted under 35 U.S.C. 154(b) by 117 days.

(21) Appl. No.: 10/085,161

(22) Filed: Mar. 1, 2002

(65) Prior Publication Data

US 2003/0171215 A1 Sep. 11, 2003

(51) Int. Cl.
*B01J 23/50* (2006.01)

(52) U.S. Cl. ...................................... 502/348; 502/439

(58) Field of Classification Search ................ 502/347, 502/348, 355, 415, 439, 330
See application file for complete search history.

(56) References Cited

U.S. PATENT DOCUMENTS 3,853,789 A * 12/1974 Warhen et al. .............. 252/463
4,260,524 A * 4/1981 Yamada et al. ............. 252/463
4,330,437 A 5/1982 Krueger
4,361,504 A * 11/1982 Solomon et al. ............ 252/463
4,400,308 A * 8/1983 Alter et al. ................. 252/463
4,458,032 A 7/1984 Rebsdat et al.
4,530,910 A 7/1985 Mross et al.
4,766,105 A 8/1988 Lauritzen
4,769,358 A 9/1988 Kishimoto et al.
4,806,518 A 2/1989 Boxhoorn et al.
4,810,689 A 3/1989 Hayden
5,051,395 A 9/1991 Mitchell et al.
5,057,481 A * 10/1991 Bhasin ....................... 502/208
5,063,195 A * 11/1991 Jin et al. .................... 502/341
5,187,140 A * 2/1993 Thorsteinson et al. ...... 502/348
5,504,052 A 4/1996 Rizkalla et al.
5,646,087 A 7/1997 Rizkalla et al.
5,705,661 A 1/1998 Iwakura et al.
5,985,790 A * 11/1999 Moskovitz et al. ......... 502/415
6,103,916 A 8/2000 Takada et al.
6,368,998 B1 * 4/2002 Lockemeyer ............... 502/347
6,579,825 B2 * 6/2003 Lockemeyer ............... 502/347

* cited by examiner

*Primary Examiner*—Edward M. Johnson
(74) *Attorney, Agent, or Firm*—Roberts & Roberts, LLP

(57) ABSTRACT

The invention relates to the aqua-thermal treatment of an ethylene oxide catalyst carrier and to a silver catalyst prepared therefrom.

12 Claims, No Drawings

ETHYLENE OXIDE CATALYST CARRIER PREPARATION

BACKGROUND OF THE INVENTION

1. Field of the Invention

The present invention relates to silver catalysts for the oxidation of ethylene to ethylene oxide, and especially to the preparation of catalyst carriers or supports having improved properties such that catalysts comprising the carriers have enhanced utility.

2. Description of the Prior Art

Processes for the production of ethylene oxide involve the vapor phase oxidation of ethylene with molecular oxygen using a solid catalyst comprised of silver on a carrier such as alumina. There have been efforts by many workers to improve the effectiveness and efficiency of the silver catalyst for producing ethylene oxide. U.S. Pat. No. 5,051,395 provides an analysis of these efforts of various prior workers.

Carriers for ethylene oxide catalysts are most often comprised of low-porosity alpha—$Al_2O_3$ particles sintered together with the aid of bond materials. The ethylene oxide (EO) catalyst is commonly produced by depositing silver and various activity and selectivity promoters onto the carrier. Deposition can be accomplished in a variety of ways including adsorption, exchange, precipitation or impregnation. Silver and promoters can be deposited sequentially or co-deposited in a single step, or by a combination of sequential or co-deposition steps. Following the deposition step(s), the finshed catalyst is generally obtained by heat treatments such as drying, calcinations or other activation procedures.

Important parameters in evaluating catalyst performance are the efficency for making EO (i.e. EO selectivity), catalyst activity, and catalyst stability. Performance can be influenced by composition of both the carrier and catalyst and the preparation and processing procedures applied to both carrier and catalyst.

Catalyst stability, or resistance to deactivation, can be improved by treating the carrier prior to deposition of silver and promoters. A particularly beneficial pretreatment procedure involves washing the carrier in pure water, or in aqueous solutions containing active ions. The exact mechanism by which increased stability is realized is not clear. However, it is known that during washing, materials are leached from the carrier such as alkali metal cations, alkaline earth metal cations, silica(tes), alumina(tes), aluminosilica (tes), and the like.

Carrier washing generally affords a modest improvement in catalyst stability. However, it remains an objective of workers in the field to make further improvements.

BRIEF DESCRIPTION OF THE INVENTION

It has now been discovered that cycles of washing and calcination applied repetitively to the carrier prior to deposition of silver and promoters, give a surprising improvement in catalyst stability. This procedure is given the name aqua-thermal carrier treatment. When aqua-thermal carrier treatment was employed the resulting catalysts showed up to a 30-fold improvement in selectivity stability compared to equivalent catalysts made with untreated, native carrier. Whereas, carrier washing alone, as provided by the prior art, without the special calcination and washing cycles of the aqua-thermal carrier treatment, provided only about a 3-fold improvement in catalyst stability.

DETAILED DESCRIPTION

In accordance with the present invention, the carrier is subjected to aqua-thermal treatment prior to deposition of silver and promoter components.

Aqua-thermal carrier treatment involves a series of carrier washing and carrier calcination procedures applied in sequence. The first step is preferably carrier washing. As an essential aspect of the invention, after completion of the initial wash, the carrier is dried and calcined before application of at least one additional wash procedure. At a minimum, aqua-thermal carrier treatment incorporates at least one wash-calcine-wash cycle. Application of additional calcination-wash cycles can further improve the carrier, and is therefore an integral part of the present invention. Preferably, the number of additional wash cycles is from zero to five, and most preferably, from zero to three. As the final step, the carrier must be dried, or optionally calcined, to complete the aqua-thermal carrier treatment.

Washing involves immersing the carrier in water, or in water containing active ions. Aqueous solutions of $NH_4F$ are especially preferred although other active ions are also useful. Non-limiting examples are dilute aqueous solutions of mineral acids (e.g. hydrohalic or hydrooxyhalic acids, or the oxyacids of nonmetals such as nitrogen, phosphorous and sulfur), organic acids (e.g. carboxylic, sulfonic or phosphonic acids) or salts of alkali metal ions (Group IA), alkaline earth metal ions (Group IIA) or ammonium ion with, for example, acetate, carbonate, hydroxide, halide, nitrate, oxalate, phosphate, sulfate, etc. When a wash with water containing active-ions is used, it is followed by a rinse with deionized water. Together, these steps comprise the washing step of the aqua-thermal carrier treatment.

Where the aqua-thermal carrier treatment comprises carrier washing in aqueous solutions of ammonium fluoride, the molar concentration of ammonium fluoride is usually between 0.0001 and 5.0. Where the aqua-thermal carrier treatment comprises carrier washing in aqueous solutions of mineral acids including hydrohalic or hydrooxyhalic acids, or the oxyacids of nitrogen, phosphorous and sulfur, or carboxylic acids, or sulfonic acids, or phosphonic acids, or the like, the molar concentration of hydronium ion in such solutions is usually between 0.0001 and 5.0. Where the aqua-thermal carrier treatment comprises carrier washing in aqueous solutions of salts of alkali metal ions (Group IA), alkaline earth metal ions (Group IIA) or ammonium ion, or the like, with acetate, carbonate, hydroxide, halide, nitrate, oxalate, phosphate, sulfate or the like, the molar concentration of the salt is usually between 0.0001 and 5.0.

In the calcinations step(s), the carrier is heated to a temperature exceeding 200° C., illustratively to between 300 and 1000° C., for at least 0.5 hours, or more preferably, at least 2 hours. Usually, the carrier is heated in purified air; however, other gaseous environments are also suitable (e.g. oxygen or steam), or those gaseous environments which do not comprise oxygen (eg. nitrogen, helium, argon, and the like).

After completion of the aqua-thermal treatment, the carrier is dried prior to impregnation with the various catalyst components. Drying at temperatures of 50 to 1000° C. are generally suitable.

Carriers treated in accordance with the invention are those containing principally alpha-alumina, particularly those containing up to about 15 wt % silica. Especially preferred carriers have a porosity of about 0.1–1.0 cc/g and preferably about 0.2–0.7 cc/g. Preferred carriers also have a relatively low surface area, i.e. about 0.2–2.0 $m^2/g$, preferably 0.4–1.6

$m^2/g$ and most preferably 0.5–1.3 $m^2/g$ as determined by the BET method. See J. Am. Chem. Soc. 60, 3098–16 (1938). Porosities are determined by the mercury porosimeter method; see Drake and Ritter, Ind. Eng. Chem. anal. Ed., 17, 787 (1945). Pore and pore diameter distributions are determined from the surface area and apparent porosity measurements.

For use in commercial ethylene oxide production applications, the carriers are desirably formed into regularly shaped pellets, spheres, rings, etc. Desirably, the carrier particles may have equivalent diameters in the range from 3–12 mm and preferably in the range of 4–10 mm, which are usually compatible with the internal diameter of the tubes in which the catalyst is placed. An equivalent diameter is the diameter of a sphere having the same external surface (neglecting surface within the pores of the particle) to volume ratio as the carriers particles being employed.

Catalysts prepared in accordance with this invention contain up to about 30% by weight of silver, expressed as metal, deposited upon the surface and throughout the pores of the support. Silver contents of about 5–20% based on weight of total catalyst are preferred, while silver contents of 8–15% are especially preferred.

In addition to silver, the catalyst of the invention also contains promoters, especially an alkali metal promoter component. The amount of the alkali metal promoter generally is not more than 3000 ppm based on the total catalyst weight. Preferably the catalyst contains 400–1500 ppm and more preferably 500–1200 ppm alkali metal. Preferably the alkali metal is cesium although lithium, potassium, rubidium and mixtures thereof can also be used.

An optional practice of the invention is the inclusion of sulfur as a catalyst promoter component. Sulfur is usually added as a sulfate salt, e.g. cesium sulfate, ammonium sulfate, and the like. U.S. Pat. No. 4,766,105 describes the use of sulfur promoting agents, for example at column 10, lines 53–60, and this disclosure is incorporated herein by reference. The sulfur is usually added to the carrier with silver, in the impregnation solution. When used, the preferred amount of sulfur (expressed as the element) is 5–300 ppm by weight, based on the total weight of catalyst.

The catalyst may also contain a fluoride promoter in the amount of 10–300 ppm by weight based on the total weight (expressed as the element), of the catalyst. Ammonium fluoride, alkali metal fluoride, or other soluble fluoride salts are usually added to the carrier, with silver, in the impregnation solution.

Preferably, the silver is added to the carrier, which has been aqua-thermally treated, by immersion of the carrier into a silver/amine impregnation solution or by the incipient wetness technique. A single impregnation or a series of impregnations may be used, depending upon the concentration of the silver in the solution and the desired loading of silver on the carrier. To obtain catalysts having silver contents within the preferred range, suitable impregnating solutions will generally contain from 5–40 wt % silver, expressed as metal. The exact concentration employed will depend upon, among other factors, the desired silver content in the catalyst, the nature of the carrier, the viscosity of the liquid, and the solubility of the silver compound.

In the impregnation, the silver solution is allowed to completely penetrate the pores of the pretreated carrier. Most preferably, the dry pretreated carrier is placed under vacuum, and then the silver solution is introduced while maintaining the vacuum. Ambient pressure is then restored when the carrier is completely covered with the impregnation solution. This ensures that all the pores of the carrier are filled with the impregnating solution.

The impregnating solution, as already indicated, is characterized as a silver/amine solution, preferably such as is fully described in U.S. Pat. No. 3,702,259 the disclosure of which is incorporated herein by reference.

After impregnation, any excess impregnating solution is separated from the impregnated carrier, and the impregnated carrier is activated by heating. In the most preferred practice of the invention, activation is carried out as described in commonly assigned U.S. Pat. No. 5,504,052 granted Apr. 2, 1996 and U.S. Pat. No. 5,646,087 granted Jul. 8, 1997, the disclosures of which are incorporated herein by reference. Preferably, the impregnated carrier is heated, at a gradual rate, to a maximum temperature between 200° C. and 500° C., for a time sufficient to convert the contained silver salt to silver metal and to remove the volatiles.

During activation, the impregnated carrier is preferably kept under inert atmosphere while its temperature is above 300° C. Appropriate inert atmospheres are those which are essentially free of oxygen.

An alternative method of activation is to heat the catalyst in a stream of air at a temperature not exceeding 300° C., preferably not exceeding 270° C.

Catalysts prepared in accordance with the invention have improved performance, especially with regard to stability, for the production of ethylene oxide by the vapor phase oxidation of ethylene with molecular oxygen. This process involves reaction temperatures of about 150° C. to 400° C., usually about 200° C. to 300° C., and reaction pressures in the range from 0.5 to 35 atm. Reactant feed mixtures contain 0.5 to 20% ethylene and 3 to 15% oxygen, with the balance being nitrogen, carbon dioxide, methane, ethane, argon or other inert gases.

Illustrative carriers treated in accordance with the invention include those having the characteristics shown in TABLE 1.

TABLE 1

CARRIER PROPERTIES

| Property | Carrier A | Carrier B |
|---|---|---|
| Raschig ring Dimensions | 8.0 mm × 6.4 mm | 8.0 mm × 8.0 mm |
| $Al_2O_3$ (wt %) | 99.1 | 99.1 |
| $SiO_2$ (wt %) | 0.75 | 0.77 |
| $C_aO$ (wt %) | 0.07 | 0.08 |
| $Na_2O$ (wt %) | 0.06 | 0.06 |
| $K_2O$ (wt %) | 0.03 | 0.03 |
| Nitric Acid Leachables (ppm)[a] | 80 Na | 69 Na |
| | 40 K | 34 K |
| Water Absorption (%) | 30.2 | 30.8 |
| Total Pore Volume (Hg, $cm^3/g$) | 0.32 | 0.32 |
| Median Pore Diameter ($\mu m$) | 1.0 | 1.1 |
| BET Surface Area ($m^2/g$) | 0.93 | 0.91 |

[a]10 g carrier heated to reflux, in 300 $cm^3$ of 4.8 M nitric acid, for 20 minutes. Filtered leachate analyzed for Na and K by ICP-AES.

The following examples illustrate the invention.

Carrier Pretreatments

The carriers were provided by Saint-Gobain NorPro Corp. Carrier properties are given in TABLE 1. These carriers were either used as supplied or after various pretreatments as described below.

Carrier A-1

Carrier A was immersed in stirred 0.10 M $NH_4F$ solution for 20 h. After which, the solution was decanted, and the carrier was rinsed thoroughly with deionized water. Next, the carrier was again treated in 0.10 M $NH_4F$ for 6 h. After decanting the solution, the carrier was rinsed thoroughly with deionized water, dried at 150° C., and then calcined 6 h. at 700° C. Following the calcination, the carrier was again treated in 0.10 M $NH_4F$ solution, for 20 hr, then rinsed and dried at 150° C. This procedure represents the wash-calcine-wash sequence of the aqua-thermal treatment in accordance with the invention.

Carrier A-2

Carrier A-1 was calcined 6 h. at 700° C. The calcined carrier was then immersed in stirred 0.10 M $NH_4F$ solution for 20 h. After which, the solution was decanted, and the carrier was rinsed thoroughly with deionized water, and finally dried at 150° C. This represents the wash-calcine-wash-calcine-wash aqua-thermal sequence in accordance with the invention.

Carrier A-3

Carrier A was immersed in stirred 0.10 M $NH_4F$ solution for 2 h. After which, the solution was decanted, and the carrier was rinsed thoroughly with deionized water, dried at 150° C., and then calcined 6 h. at 350° C. This cycle was repeated so that the carrier was calcined three times. After the fourth and final 0.10 M $NH_4F$ wash, however, the carrier was only dried at 150° C. This represents the wash-calcine-wash-calcine-wash-calcine-wash sequence in accordance with the invention.

Carrier A-4, Comparative Example

Carrier A was immersed in stirred 0.10 M $NH_4F$ solution for 20 h. After which, the solution was decanted, and the carrier was rinsed thoroughly with deionized water. Next, the carrier was again treated in 0.10 M $NH_4F$ for 6 h. After decanting the solution, the carrier was rinsed thoroughly with deionized water, dried at 150° C. and then calcined 6 h. at 350° C. This wash-calcine sequence does not incorporate the special wash-calcine and repeat wash procedure of the aqua-thermal carrier treatment of the invention.

Carrier Impregnation and Catalyst Activation

Preparation of Silver Solution

An 844 g portion of high purity silver oxide (Ames Goldsmith Corp.) was added to a stirred solution of 442 g oxalic acid dihydrate (ACS Certified Reagent, Fisher) in about 2,500 g deionized water. A precipitate of hydrated silver oxalate salt formed on mixing. Stirring was continued for 0.5 h. The precipitate was then collected on a filter and washed with deionized water. Analysis showed that the precipitate contained 48.0 wt % silver.

Next, 716.0 g of the silver oxalate precipitate was dissolved in a mixture of 239.4 g ethylenediamine (99+%, Aldrich) and 366.5 g deionized water. Temperature of the solution was kept below 40° C. by combining the reagents slowly, and by cooling the solution. After filtration, the solution contained 26.0 wt % silver, and had a specific gravity of 1.46 g/cm$^3$.

EXAMPLE 1

A 150 g portion of Carrier A-1 was placed in a flask and evacuated to ca. 0.1 torr prior to impregnation. To 183.6 g of the above silver solution were added the following aqueous solutions: 0.972 g of 19.4 wt % CsOH, 0.327 g of 18.3 wt % $NH_4HSO_4$, and 0.732 g of 6.0 wt % $NH_4Cl$. After thorough mixing, the promoted silver solution was aspirated into the evacuated flask to cover the carrier while maintaining the pressure at ca 0.1 torr. The vacuum was released after about 10 minutes to restore ambient pressure, hastening complete penetration of the solution into the carrier pores. Subsequently, the excess impregnation solution was drained from the impregnated carrier.

Activation of the impregnated carrier was done on a moving-belt calciner. In this unit, the impregnated carrier is transported on a stainless-steel belt through a multi-zone furnace. All seven zones of the furnace are continuously purged with preheated, ultra-high purity nitrogen. Temperature is increased gradually as the catalyst passes from one zone to the next. Heat is radiated from the furnace walls and from the preheated nitrogen.

In Example 1, the wet catalyst entered the furnace at ambient temperature. Temperature was then increased gradually to a maximum of about 400° C. as the catalyst passed through the heated zones. In the last (cooling) zone, the catalyst temperature was lowered to less than 100° C. before it emerged again into the ambient atmosphere. The total residence time in the furnace was approximately 22 minutes. By analysis, the finished catalyst was found to contain 11.4 wt % Ag, 440 ppm Cs and 40 ppm S.

For testing, the catalyst was charged into a fixed-bed stainless steel tube reactor (5.3 mm approximate inner diameter), which was immersed in a molten-salt heating bath. The reactor charge consisted of 2.5 g crushed catalyst (1.0–1.4 mm particle size) mixed with 8.0 g inert material (similar particle size). The feed gas consisted by volume of 15% ethylene, 7% oxygen, 8% carbon dioxide, ethylene dichloride inhibitor, and nitrogen balance, fed at a flow rate of 50 L/h (25° C., 1 atm). The amount of ethylene dichloride was adjusted to about 0.70 ppm in the feed stream. Reaction pressure was maintained at 19.4 atm. The reactor effluent was analyzed by mass spectrometry at roughly 20-minute intervals. Temperature was adjusted to maintain 1.7% EO in the reactor effluent for a productivity of 670 g-EO per kg-catalyst per hour. The EO productivity was kept high to facilitate evaluation of catalyst stability.

After about 500 h on stream in the reactor test, Example 1 achieved an EO selectivity of 82.6% at 246° C. One month later, the EO selectivity was 82.0% at 249° C., and two months later 81.6% at 251° C. Overall, the rate of EO selectivity decline was about 0.4 points/month. Temperature increased 2.9° C./month.

EXAMPLES 2–5

Various concentrations of cesium in the catalyst were evaluated in Examples 2–5. These catalysts were prepared following the procedures of Example 1 except that in the impregnation of Carrier A-1, the amounts of CsOH and $NH_4HSO_4$ solutions were varied. Final compositions are listed in TABLE 2. Catalyst test results, collected in the same manner as in Example 1, are also included. Both high selectivity and good stability were obtained at the 550 ppm cesium level.

TABLE 2

COMPOSITION AND PERFORMANCE DATA FOR CATALYST PREPARED ON CARRIER A-1

| | Ag (wt %) | Cs (ppm) | S (ppm) | T (° C.) | ΔT (° C./ month) | EO Sel (mol %) | ΔSel (pts/ month) |
|---|---|---|---|---|---|---|---|
| Ex 1 | 11.4 | 440 | 30 | 246 | 2.9 | 82.6 | −0.4 |
| Ex 2 | 11.6 | 550 | 40 | 247 | 2.9 | 82.8 | −0.1 |
| Ex 3 | 12.4 | 670 | 40 | 254 | 5.8 | 83.0 | −0.5 |

TABLE 2-continued

COMPOSITION AND PERFORMANCE DATA FOR CATALYST PREPARED ON CARRIER A-1

| | Ag (wt %) | Cs (ppm) | S (ppm) | T (° C.) | ΔT (° C./ month) | EO Sel (mol %) | ΔSel (pts/ month) |
|---|---|---|---|---|---|---|---|
| Ex 4 | 11.4 | 710 | 50 | 266 | 13.0 | 80.8 | −3.2 |
| Ex 5[a] | 12.0 | 930 | 50 | 270 | na | 73.5 | na |

[a]Catalyst has low activity. The concentration of EO in the product stream at 270° C. was only 0.7%.

EXAMPLE 6

This catalyst was prepared following the procedure of Example 1 except that Carrier A-2 was used instead of Carrier A-1. The finished catalyst was found to contain 11.5% Ag, 530 ppm Cs and 40 ppm S. This concentration of Cs was separately determined to be optimum for this carrier.

Reactor testing for Example 6 was done as in Example 1. After about 600 h on stream, the catalyst achieved an EO selectivity of 82.6% at 249° C. One month later, the EO selectivity was 82.6% at 251° C., and two months later, 82.6% at 253° C. Overall, the rate of EO selectivity decline was less than 0.05 points/month. Temperature increased at about 2.0° C./month.

EXAMPLE 7

This catalyst was prepared following the procedure of Example 1 except that Carrier A-3 was used instead of Carrier A-1. The finished catalyst was found to contain 11.7 wt % Ag, 550 ppm Cs and 45 ppm S. This concentration of Cs was separately determined to be optimum for this carrier.

Reactor testing for Example 7 was done as in Example 1. After about 600 h on stream, the catalyst achieved an EO selectivity of 81.9% at 249° C. One month later, the EO selectivity was 81.9% at 255° C. After nearly two months on stream, EO selectivity remained unchanged; whereas, temperature increased at about 6.4° C./month.

EXAMPLE 8 (Comparative)

The procedure of Example 1 was followed except that the native Carrier A was used instead of Carrier A-1. The finished catalyst was found to contain 12.0 wt % Ag, 550 ppm Cs and 45 ppm S. This concentration of Cs was separately determined to be optimum for this carrier.

Following the testing procedures of Example 1, the catalyst achieved an EO selectivity of 82.1% at 251° C. after 150 h on stream. One month later, the EO selectivity had already dropped to 80.6% at 255° C. Overall, the rate of EO selectivity decline was 1.4 points/month. Temperature increased at about 3.8° C./month. It was therefore concluded that catalysts prepared on untreated carrier are unstable.

EXAMPLES 9–13 (Comparative)

Following the procedures of Example 1, Carrier A-4 was impregnated with silver solution and promoters to achieve the compositions listed in TABLE 3. Catalyst test data, following the methodology of Example 1, are also included in the table.

The optimum Cs concentration for catalyst prepared from Carrier A-4 is 540 ppm (Example 10) based on the data in TABLE 3. Selectivity for Example 10 decreases at a rate 3.5-times slower than the optimized catalyst prepared on untreated carrier (Example 8). Washing the carrier in the manner described for Carrier A-4 therefore improves catalyst performance. However, Example 10 still suffers selectivity loss at a rate at least 4- to 8-times faster than catalysts including aqua-thermal carrier treatment of the invention. In the field of commercial EO catalysis, this is a very significant difference. Clearly, the combination of repetitive carrier washing and calcination as provided by the aqua-thermal treatment of the invention affords much greater catalyst stability.

TABLE 3

COMPOSITION AND PERFORMANCE DATA FOR CATALYST PREPARED ON CARRIER A-4 (Comparative)

| | Ag (wt %) | Cs (ppm) | S (ppm) | T (° C.) | ΔT (° C./ month) | EO Sel (mol %) | ΔSel (pts/ month) |
|---|---|---|---|---|---|---|---|
| Ex 9 | 11.3 | 440 | 40 | 245 | 5.9 | 81.9 | −0.8 |
| Ex 10 | 11.4 | 540 | 40 | 246 | 5.6 | 82.3 | −0.4 |
| Ex 11 | 11.8 | 670 | 40 | 254 | 6.1 | 82.8 | −0.7 |
| Ex 12 | 11.6 | 720 | 50 | 260 | 9.5 | 82.0 | −1.0 |
| Ex 13[a] | 12.1 | 940 | 50 | 265 | na | 74.5 | na |

[a]Catalyst has low activity. The concentration of EO in the product stream at 265° C. was only 0.9%.

I claim:

1. In a process for the preparation of a catalyst for the production of ethylene oxide comprised of silver supported on an alumina carrier, the improvement which comprises subjecting the carrier to aqua-thermal treatment prior to deposition of silver, such aqua-thermal treatment comprising a sequential series of at least two carrier washings with intermediate carrier calcination at a temperature above 200° C.

2. The process of claim 1 wherein the said aqua-thermal treatment comprises a sequential series of at least two carrier washings with intermediate carrier calcination at a temperature in the range 300° C. to 1000° C.

3. The process of claim 1 wherein the said aqua-thermal carrier treatment comprises a sequence of carrier wash and carrier calcination cycles, such that the carrier is first subjected to a wash cycle which includes sequential washes numbering from one to five, and then the carrier is calcined at a specified temperature above 2000° C. before being subjected to a further wash cycle which includes from one to five individual carrier washes.

4. The process of claim 3 wherein the sequence is repeated until the carrier is subjected to a total of from two to five wash cycles, each wash cycle including from one to five individual carrier washes, and from one to four calcination cycles positioned between successive wash cycles.

5. The process of claim 1 wherein the said carrier calcination is at least 0.5 hours in duration.

6. The process of claim 5 wherein the said carrier calcination is performed in air or other gaseous environment including oxygen.

7. The process of claim 5 wherein the said carrier calcination is performed in a gaseous environment that is essentially free of oxygen.

8. The process of claim 1 wherein the carrier is heated to 50–1000° C. after the aqua-thermal treatment.

9. The process of claim 1 wherein the said aqua-thermal treatment comprises carrier washing in water that is essentially free from impurities.

10. The process of claim 1 wherein the said aqua-thermal treatment comprises carrier washing in aqueous solutions of ammonium fluoride, such that the molar concentration of ammonium fluoride is between 0.0001 and 5.0.

11. The process of claim 1 wherein the said aqua-thermal treatment comprises carrier washing in aqueous solutions of mineral acids including hydrohalic; hydrooxyhalic acids; the oxyacids of nitrogen, phosphorus and sulfur; carboxylic acids, sulfonic acids; or phophonic acids, such that the molar concentration of hydronium ions is between 0.0001 and 5.0.

12. The process of claim 1 wherein the said aqua-thermal carrier treatment comprises carrier washing in aqueous solutions of salts of alkali metal ions (Group IA), alkaline earth metal ions (Group IIA) or ammonium ion, with acetate, carbonate, hydroxide, halide, nitrate, oxalate, phosphate, sulfate or the like, such that the molar concentration of the salt is between 0.0001 and 5.0.

* * * * *